United States Patent Office 2,755,257
Patented July 17, 1956

2,755,257

PREPARATION OF CATALYST CONTAINING IONS OF COBALT AND MOLYBDENUM

Joseph J. Donovan, Swarthmore, Pa., David W. Koester, Wilmington, Del., and Thomas Henry Milliken, Jr., Moylan, Pa., assignors to Houdry Process Corporation, Wilmington, Del., a corporation of Delaware No Drawing. Application May 24, 1955,
Serial No. 510,832

1 Claim. (Cl. 252—465)

This invention relates to the preparation of a catalyst consisting of at least one cobalt compound and at least one molybdenum compound on a gamma alumina carrier, which catalysts are especially effective for the hydrodesulfurization of organic materials such as petroleum distillates.

In recent years the petroleum industry has made increasing use of hydrodesulfurization methods, particularly because of the increasing amounts of high sulfur, low grade petroleum crudes. As a laboratory method, catalytic hydrodesulfurization has been a preferred procedure for removing sulfur from organic matter for many years. The increase in the utilization of hydrodesulfurization procedures has been attributable to a considerable extent to the changes in the relative cost of hydrogen, high pressure equipment, and charging stocks. Some of the early catalytic hydrodesulfurization methods were described in Day 826,089 and Evans 1,257,829. The unique advantages of molybdena catalysts were recognized in Whcl 1,971,888 and Harding 1,881,534. The effectiveness of various activators, and especially the group VIII elements, and particularly cobalt, for molybdena catalysts was described in Meigs 1,486,787, Meeharg 1,913,405, Lazier 2,105,665 and other literature. Hydrodesulfurization methods relying on molybdena activated by cobalt were described in Grosse 2,029,100, Gaus et al. 1,932,174, Pier et al. 1,932,186 and Guthke 1,932,369.

By using low space rates, very high pressures, subcracking temperatures and high hydrogen to naphtha ratio, it was possible to achieve better than 90% removal of sulfur at an early date. In order to compare the effectiveness of hydrodesulfurization catalysts, it is convenient to measure the residual sulfur (assuming any hydrodesulfurization catalyst would remove most of the sulfur) at conditions of temperature, pressure, space rate and hydrogen ratio suitable for focusing attention on the differences amongst the catalysts. In refinery operation, changing economic conditions have altered the overall cost advantage of using various combinations of process conditions such as space rate. Thus there has been a continuing demand for better and better hydrodesulfurization catalysts notwithstanding the moderately good performance of long available catalysts, and notwithstanding the difficulty of establishing the marginal superiority of the better catalysts by any tests other than prolonged industrial utilization thereof.

Even with the most modern analytical methods, there is some uncertainty regarding the chemical nature of the active components of a hydrodesulfurization catalyst containing at least one cobalt compound and at least one molybdenum compound. Catalysts of this type do not ordinarily contain cobalt in the metallic state nor molybdenum in the metallic state. Some terms such as "cobalt-moly" are frequently used to designate all members of this class of catalyst without regard to the presence or absence of compounds such as cobalt molybdate.

Cobalt molybdate ($CoMoO_4$) is an interesting chemical species and at least some of the several chemical compounds such as $CoMoO_4$, $CoMoO_3$, $CoS \cdot MoO_3$, $CoS \cdot MoO_2$, $CoMoS_4$ and the like have been prepared and identified as distinguishable compounds.

Under various hydrodesulfurization conditions, some of the cobalt and/or molybdenum is probably reduced to a lower oxidation state and/or chemically bound to the sulfur instead of being entirely in the oxide form. Whether certain of the theoretically conceivable compounds are present in pure or mixed form in certain catalysts having cobalt-moly distributed in a carrier is not unanimously agreed upon by chemists interpreting the ambiguous and conflicting evidence. Some writers have assumed that a catalyst was characterized by a particular compound, notwithstanding the uncertainty as to the exact chemical nature of the catalyst. In interpreting literature relating to the catalyst comprising at least one cobalt compound and at least one molybdenum compound, it is important to recognize that some authorities would interpret the description of the chemical structure of the active component of the catalyst in a manner different from that set forth in the prior publications.

In crystallography and in the description of solids, the term "ion" is employed to designate a component of the solid, and such usage should not be confused with the term "ion" as employed in connection with aqueous solutions of ionizable compounds.

Various ratios of cobalt ion to molybdenum ion have been utilized in solid catalysts containing such ions. In order to generically describe a wide variety of catalysts of this type, while maintaining a vague ambiguity about those fields of chemistry in which some experts might disagree, it is convenient to designate the active component as $Co_yMoQ_{1+x+y}$, in which Q represents one or more members from a group comprising oxygen, sulfur, and other anions capable of combining with cobalt and/or molybdenum, in which $x$ represents the relative oxidation-reduction state of the cobalt and/or molybdenum, and in which $y$ represents the cobalt to molybdenum ratio, generally within the range of from 0.01 to 10 cobalt ions per 1 molybdenum ion. The active components of most prior-art catalysts containing cobalt and molybdenum as the only active metal ions can be described under said generic formula $Co_yMoQ_{1+x+y}$.

Catalysts consisting of cobalt-moly on a carrier have been prepared by a variety of procedures, including coprecipitation, sublimation, mixing of hydrous gels and the impregnation of carriers followed by heat activation of the impregnated carrier.

In the heat activation step of preparing a cobalt-moly catalyst by any impregnation procedure, the salts are decomposed into simpler compounds such as oxides. For example, cobalt nitrate can be decomposed to leave cobalt oxide on the carrier, and ammonium molybdate can be decomposed to leave molybdenum oxide on the carrier. Cobalt molybdate type of compounds result from the heat activation of a carrier impregnated with a suitable mixture of cobalt and molybdenum salts of a thermally decomposable nature.

Most of the solid catalysts employed in the petroleum industry consist of a minor amount of active component distributed on a carrier. Gamma alumina is a preferred carrier for many catalysts. Under certain circumstances, the gamma alumina can be transformed to alpha alumina, a much less effective carrier. In catalysts having active components with an acid character, such as aluminum chloride, chromia and molybdena, the gamma alumina is more readily transformed to alpha alumina. Some catalysts contain stabilizers inhibiting the gamma to alpha transformation. Greater difficulty is encountered in preventing alpha alumina formation in those processes employing temperatures above about 900° F.

Some cobalt molybdate catalysts on alumina have been employed in methods conducted at elevated temperatures. Some of the difficulties, in fact, attributable to the peculiarities of the carrier were originally blamed on the nature of the cobalt molybdate because the interrelationships between the carrier and active component were not then adequately understood.

Although a considerable amount of literature has accumulated relating to catalysts characterized by at least one compound of cobalt and at least one compound of molybdenum, it has not been feasible for expert catalyst chemists to predict precisely the performance characteristics of catalysts prepared by various methods. Instead, it has been necessary to evaluate each preparative method empirically. Only after conducting all of the steps necessary for the preparation of a catalyst, and determining the usefulness of the catalyst by measurement of its initial activity, deactivation rate, stability after regeneration, crush resistance, attrition resistance, and/or related properties, has it been possible to evaluate the method of preparing the catalyst.

Most cobalt compounds are water soluble only in acidic solutions. Most molybdenum compounds are water soluble only in alkaline solutions. Insoluble materials such as cobalt molybdate precipitate upon the mixing of such solutions. Various proposals have been made for preparing catalysts by impregnating a carrier by a single dip in an aqueous solution containing both cobalt and molybdenum compounds. Certain solubilizing agents serve to keep cobalt dissolved in aqueous alkaline solutions containing significant amounts of molybdenum compounds. Craver 1,914,558 describes the use of several hydroxy organic acids such as malic acid to form "metallic-organo complex" solutions in making an impregnated catalyst comprising compounds of cobalt and molybdenum. Engel et al. 2,650,906 describe the use of several hydroxy organic amines such as ethanolamine to keep the cobalt in soluble form in a single dip impregnating solution for preparing a cobalt-moly hydrodesulfurization catalyst. The use of large amounts of ammonium hydroxide for solubilizing cobalt in such a single dip impregnation method is described in Nahin et al. 2,510,189. Skilled cobalt chemists have long known of numerous methods of preparing aqueous alkaline solutions containing cobalt, but such knowledge has been quite inadequate for solving the problem of preparing effective hydrodesulfurization catalysts comprising at least one cobalt compound and at least one molydenum compound. Only by empirical utilization of a completed catalyst has it been feasible to evaluate any specific method of preparing a cobalt-moly hydrodesulfurization catalyst. Earlier literature describes many procedures for preparing cobalt-moly catalysts which have been of only theoretrical interest because their performance characteristics were inferior to those of conventional catalysts. Thus it has been very obvious that modifications in the procedure for making cobalt-moly catalysts would probably not provide improved catalysts but only materials of theoretical interest.

In accordance with the present invention, a cobalt-moly catalyst is prepared in an unobvious and novel manner, said catalyst having the surprising characteristic of being superior to conventional cobalt-moly catalysts. An aqueous solution characterized by the presence of 1,2 diamino ethane in a concentration of at least 2 molar, and containing from 1.2 to 1.8 molar molybdenum compound and a concentration of a cobalt compound providing a cobalt to molybdenum ion ratio of from about 0.3 to 1.1 to 1 is employed for impregnating particles of catalyst carrier characterized as activated gamma alumina, and the thus impregnated particles are dried and heat activated to form a catalyst consisting essentially of a gamma alumina carrier and a minor amount of molybdenum in chemically combined form, and a smaller amount of cobalt in chemically combined form, there being from about 0.3 to 1.1 cobalt cations per molybdenum cations, which catalyst is highly effective in the hydrodesulfurization of organic materials such as petroleum distillates. Moreover the catalyst thus prepared is highly effective in hydrogenative reforming, hydrogenation of olefins, vapor phase oxidation of organic materials, and other methods utilizing cobalt-moly catalysts. Surprisingly, the catalyst not only performs as well as conventional cobalt-moly catalysts under a variety of conditions, but actually is superior to conventional cobalt-moly catalyst under test conditions.

Reference is now made to examples of preparation of catalysts containing at least one compound of cobalt and at least one compound of molybdenum.

*Example I*

A composition consisting predominantly of alumina trihydrate and containing a quantity of liquid insufficient to form a paste was subjected to high pressure extrusion to form cylinders which were sliced into pellets. These pellets were rapidly dried below 300° F. and then more slowly dehydrated under higher humidity conditions as the temperature was raised to about 600° F. By this heat treatment, activated gamma alumina pellets were prepared. Such pellets had an area of about 200 m.²/g. and were suitable for use as a carrier in the preparation of cobalt-moly catalyst particles. The cobalt and molybdenum compounds were impregnated into the carrier by immersion of the pellets in a "single dip" impregnating solution for one hour. Approximately 300 cc. of pellets were subjected to an approximately equal volume of impregnating solution prepared as follows:

A clear solution of 89 grams of ammonium molybdate was mixed with 62 cc. of a 3.6 molar aqueous solution of cobalt nitrate hexahydrate, thereby developing a purple gelatinous precipitate, thus indicating the formation of some cobalt molybdate. Thereafter, 45 cc. (about 40.5 grams or 0.68 mol) of 1,2 diamino ethane was added slowly with stirring, thereby bringing about the dissolving of the cobalt molybdate precipitate. After all of the bluish-purple precipitate had been thus brought into solution, sufficient water was added to provide a volume of impregnating solution substantially equal to the volume of activated alumina pellets to be impregnated, that is to 300 cc. This solution contained 1,2 di-amino ethane in a concentration of 2.25 molar, molybdenum in a concentration of 1.51 molar, and cobalt in a concentration of 0.74 molar. This solution was employed to impregnate 300 cc. of gamma alumina pellets.

Thereafter the impregnated pellets were dried at 270° F. for one hour to remove the readily volatile components, and the dried pellets were heat-activated at a temperature maintained within the range from about 800° F. to about 1050° F. for 2 hours.

The activated catalyst particles weighed 283 grams and contained about 7.92% molybdenum trioxide and about 1.83% oxide of cobalt. The cobalt ion to molybdenum ion ratio of the finished catalyst was about 0.44 to 1.

The following data were obtained using said catalyst for the hydrodesulfurization of a feed consisting of No. 1 fuel oil (350–500° F.) containing 1 wt. percent S as thiophene.

| | |
|---|---|
| Pressure, p. s. i. g. | 300 |
| Temperature, ° F. | 700 |
| LHSV | 3 |
| $H_2$/oil molar ratio | 0.7 |
| Wt. percent S converted to $H_2S$ | 94.1 |
| Dry gas, wt. percent | 0 |
| $C_4$, wt. percent | 1.5 |
| Gasoline (75–350° F.), wt. percent | 10.0 |
| No. 1 fuel oil (350–500), wt. percent | 89.8 |

These tests demonstrated that the catalyst resulting from the single dip impregnation of the activated gamma alumina carrier had an activity substantially equivalent to that of commercially available catalyst comprising compounds of cobalt and molybdenum.

*Example II*

A 5 liter batch of impregnating solution was prepared by dissolving 8 gram mols of ammonium molybdate in an aqueous solution containing 930 cc. of a technical grade of 1,2 diamino ethane of approximately 85% purity and containing about 15% water. A solution containing 3.9 gram mols of cobalt nitrate hexahydrate, constituting about 49 mol percent of the mol amount of ammonium molybdate, was added to the mixture of 1,2 diamino ethane, water and ammonium molybdate without the formation of any precipitate. After dilution to 5 liters, the aqueous impregnating solution had a pH of 8.42 and molar concentrations expressed as 2.5 M. 1,2 diamino ethane, 1.6 M. molybdenum, and 0.78 M. cobalt. This solution was employed to impregnate compounds of cobalt and molybdenum into 5 liters (4,775 grams) of attrition resistant high area (200 m.$^2$/g.) activated alumina pellets. After drying at 270°, and heat activation at about 1000° F., the pellets were found to be effective as a cobalt molybdate catalyst.

Pellets prepared in this manner were compared with commercially available cobalt-moly catalysts, tested under the identical testing conditions, and the catalyst of the present invention was found to be significantly better in reducing the residual sulfur to low levels. In such tests a synthetic blend consisting of 350–500° F. fuel oil containing 1% sulfur as added thiophene was passed at a liquid volume space rate of 3 over the catalyst at 700° F. The data for tests at various pressures and hydrogen ratios are as follows:

|  | Conventional Catalyst | | Catalyst of the Present Invention | |
| --- | --- | --- | --- | --- |
| Pressure | 700 | 300 | 700 | 300 |
| H$_2$ ratio | 6 | 0.7 | 6 | 0.7 |
| Percent incompleteness of S removal | 1.9 | 4.0 | 1.1 | 1.3 |
| Percent improvements | | | 42 | 68 |

These tests established that the catalyst particles containing oxides of cobalt and molybdenum prepared by the single dip impregnating solution of the present invention possessed a high degree of catalytic activity under reaction conditions equivalent to those industrially utilized. Moreover, some of the catalysts prepared in accordance with the present invention, but with a quantity of cobalt and/or molybdenum compounds less than those of commercial catalysts, were superior in performance to the commercial catalysts. The combination of the outstanding attrition resistance and high catalytic activity made the catalyst particles particularly suitable for processes in which the particles gravitate as a non-turbulent bed.

*Example III*

One liter of a somewhat viscous mixture was formed from 210 grams (1.46 mols) of molybdenum oxide, and 65 grams of cobaltous hydroxide (0.7 mol), 200 grams (3.34 mols) of 1,2 diamino ethane, and water, which solution was heated to about 160° F. This mixture was employed for the impregnation of 900 grams of attrition resistant (i. e. a hardness index greater than 60) activated alumina pellets having an area of about 200 m.$^2$/g.

The thus impregnated pellets are transferred to a solvent recovery distillation system and heated to 350° F. to volatilize a considerable portion of the 1,2 diamino ethane (boiling point 241° F.) which is recovered for use in subsequent batches of impregnating solution. Substantially all of the 1,2 diamino ethane is thus removed, leaving only a trace of residual organic matter on the pellets. A portion of the thus treated pellets is subjected to a carbon analysis procedure to determine the amount of residual 1,2 diamino ethane, and it is found that less than 1% of the weight of the pellet is characterized as residual organic matter. By reason of the small carbon content of the pellets, it is possible to burn out the residual organic matter without overheating the catalyst. The pellets are treated with air at 1050° F. to activate the catalyst components, and to form a catalyst conveniently designated as a cobalt-moly catalyst.

The catalyst is useful as a hydrodesulfurization catalyst and for other reactions benefiting from the use of cobalt-moly catalysts.

By procedures similar to the previous examples, it was established that the limits restricting this method of preparing a catalyst are as follows:

The carrier particles must be pre-activated by heat treatment within the range of 600 to 1700° F. for more than one hour to form carrier particles consisting predominantly of gamma alumina and having an area greater than 60 m.$^2$/g. The aqueous impregnating solution must contain more than 2 molar 1,2 diamino ethane, which serves to solubilize the cobalt, molybdenum, and/or cobalt molybdate type of compounds. The molybdenum compound concentration should be within the range from 1.2 to 1.8 molar and preferably approximately 1.5 molar in order that after the particles impregated from a convenient volume of solution have been heat activated, they will contain an appropriate amount of molybdenum in sufficiently active form. The cobalt compound concentration should be less than and related to the molybdenum compound concentration. Ordinarily best results are obtained by maintaining the cobalt molar concentration at about 50% of that of the molybdenum, but catalysts having satisfactory performance characteristics are obtained using cobalt concentrations within the range from 30 to 110% of the molar concentration of the molybdenum in the impregnating solution. It is more convenient to designate the relative concentrations by reference to the cobalt ion to molybdenum ion ratio, which must be within the range from 0.3 to 1.1 to 1.

The impregnation operation must be conducted for several minutes. The thus impregnated pellets must be dried, and then heat-activated at a temperature above 400° F. to form the highly effective catalyst particles of the present invention. These particles consist predominantly of a gamma alumina carrier, and contain a minor amount of a compound of molybdenum and a smaller amount of a compound of cobalt, there being for each gram ion of molybdenum from 0.3 to 1.1 gram ion of cobalt. Thus, in the generic formula for the active component, $Co_yMoO_{1+x+y}$, the value of $y$ for a catalyst of the present invention must be within the range of from 0.3 to 1.1.

Obviously many modifications and variations of the invention as hereinbefore set forth may be made without departing from the spirit and scope thereof, and therefore only such limitations should be imposed as are indicated in the appended claim.

What is claimed is:

The method of preparing a catalyst which includes the steps of: forming activated particles having a surface area greater than 60 m.$^2$/g. but not significantly greater than about 200 m.$^2$/g. consisting predominantly of gamma alumina by subjecting aluminaceous particles to a temperature within the range from 600 to 1700° F. for several hours; preparing a solution consisting essentially of water, a molybdenum compound in a concentration from about 1.2 to 1.8 molar, a cobalt compound in a concentration sufficient to provide a cobalt to molybdenum molar ratio from about 0.3 to about 1.1 to 1, and 1,2 diamino ethane in a concentration in excess of 2 molar but less than about 4 molar, treating the gamma alumina particles with said solution for several minutes to impregnate the particles with said solution; drying the thus impregnated particles; and heat-activating the thus dried particles at a temperature above 400° F. but less than about 1050° F. to form a catalyst consisting essentially of a gamma alumina carrier, a minor amount of a compound of molybdenum and a smaller amount of a compound of cobalt, there being for each gram ion of molybdenum from 0.3 to 1.1 gram ions of cobalt.

References Cited in the file of this patent

UNITED STATES PATENTS

| | | |
|---|---|---|
| 2,625,519 | Hartiz | Jan. 13, 1953 |
| 2,650,906 | Engel et al. | Sept. 1, 1953 |
| 2,662,860 | Engel et al. | Dec. 15, 1953 |
| 2,690,433 | Engel et al. | Sept. 28, 1954 |
| 2,691,660 | Hartig | Oct. 12, 1954 |